(12) United States Patent
Zhang

(10) Patent No.: US 8,794,064 B2
(45) Date of Patent: Aug. 5, 2014

(54) MEASURING CUP FOR WASTE OIL EXTRACTION MACHINE

(76) Inventor: Shaoyu Zhang, Guangzhou (CN)

( * ) Notice: Subject to any disclaimer, the term of this patent is extended or adjusted under 35 U.S.C. 154(b) by 282 days.

(21) Appl. No.: 13/389,427

(22) PCT Filed: Aug. 26, 2009

(86) PCT No.: PCT/CN2009/073535
§ 371 (c)(1),
(2), (4) Date: Feb. 7, 2012

(87) PCT Pub. No.: WO2011/014996
PCT Pub. Date: Feb. 10, 2011

(65) Prior Publication Data
US 2012/0132000 A1    May 31, 2012

(30) Foreign Application Priority Data
Aug. 7, 2009  (CN) .......................... 2009 1 0041722

(51) Int. Cl.
*G01F 19/00*    (2006.01)
(52) U.S. Cl.
CPC .................................... *G01F 19/00* (2013.01)
USPC ........................................................... 73/426

(58) Field of Classification Search
CPC ........................................................ G01F 23/02
See application file for complete search history.

(56) References Cited

U.S. PATENT DOCUMENTS

| 1,486,127 | A | * | 3/1924 | Davenport | 220/663 |
| 1,849,856 | A | * | 3/1932 | Trost | 222/2 |
| D92,945 | S | * | 8/1934 | Carter | D15/9.1 |
| D163,749 | S | * | 6/1951 | Dunn et al. | D15/152 |
| 5,407,086 | A | * | 4/1995 | Ota et al. | 215/383 |
| 7,213,621 | B1 | * | 5/2007 | Chang | 141/86 |

* cited by examiner

*Primary Examiner* — Hezron E Williams
*Assistant Examiner* — Mark A Shabman
(74) *Attorney, Agent, or Firm* — David W. Carstens; Carstens & Cahoon, LLP

(57) ABSTRACT

A measuring cup for a waste oil extraction machine is disclosed in the present invention, comprising an organic glass made cup body (1) provided with an explosion-proof valve connecting hole (11), a negative-pressure meter mounting hole (12) and several pull-rod insertion holes (13) thereon; the top of the cup body (1) is in a cone shape; the cup body (1) is further provided with several water-drop-shaped bulges (14) projecting outwardly and longitudinal grooves (15) on the outer surface thereof; the bulges (14) and the grooves (15) can effectively improve strength of the cup body (1).

3 Claims, 1 Drawing Sheet

MEASURING CUP FOR WASTE OIL EXTRACTION MACHINE

CROSS-REFERENCE TO RELATED APPLICATIONS

This application is a US National Stage submission under 35 USC 371 of PCT Application Number PCT/CN2009/073535 filed Aug. 26, 2009, which claims the benefit of and priority to Chinese application number CN 200910041722.0 filed Aug. 7, 2009.

TECHNICAL FIELD

The present invention relates to a measuring cup, and more particularly to a measuring cup for use in the waste oil extraction machines in automotive maintenance equipment.

THE PRIOR ART

At present the transparent measuring cups used for the waste oil extraction machines in the market for automotive maintenance in general have a structure as described below: a cup body made from organic glass is in the middle, and two glands are disposed on the two ends of the cup body respectively, by the pull-rods interlocked in the middle the cup body and the two glands are pressed together and thus sealed, however, as great suction is produced and applied on the measuring cup during the extraction process of the waste oil extraction machine, the measuring cup is easily broken, thus a solid measuring cup is mentioned in the study on the agenda.

SUMMARY OF THE INVENTION

In order to overcome the drawbacks of the existing technologies, the present invention aims to provide a measuring cup with novel design and firm structure for use in the waste oil extraction machines.

The technical solution adopted by the present invention to solve the technical problems is as: A measuring cup for waste oil extraction machine, comprising a cup body made from organic glass, the cup body being provided with an explosion-proof valve connecting hole, a negative-pressure meter mounting hole and several pull-rod insertion holes on the upper end surface thereof, the top of the cup body being cone-shaped, the cup body being further provided with several water-drop-shaped bulges projecting outwardly on the cone-shaped outer surface thereof, and several longitudinal grooves on the outer surface thereof.

As a further improvement of the technical solution above, the bulges are evenly distributed on the cone-shaped outer surface on the top of the cup body.

As a further improvement of the technical solution above, the grooves are evenly distributed on the outer surface of the cup body.

The beneficial effects of the present invention include: in the product according to the invention the upper gland and cup body are formed in one body, whereby the sealing effect of the product is guaranteed; furthermore, the top of the cup body in the invention is designed in a cone shape, this configuration is able to effectively sustain the negative pressure produced during the extraction process of the waste oil extraction machine; in addition, several bulges and grooves are provided on the outer surface of the cup body, further effectively improving the strength of the product, enhancing the impact-resistant ability of the product, and creating better appearance.

BRIEF DESCRIPTION OF THE INVENTION

Figure 1:
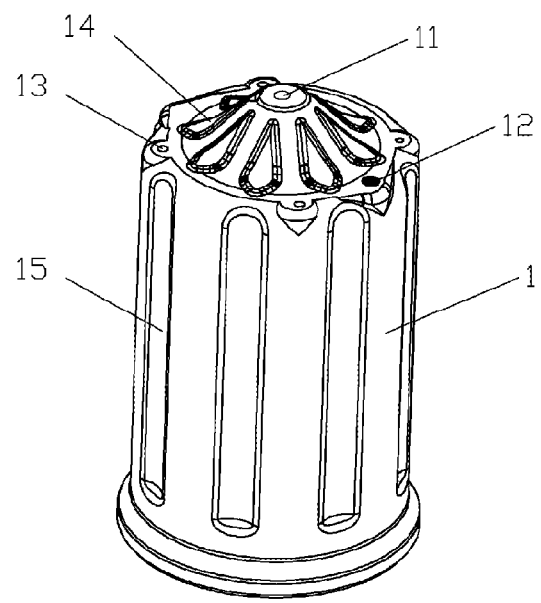
Figure 2:
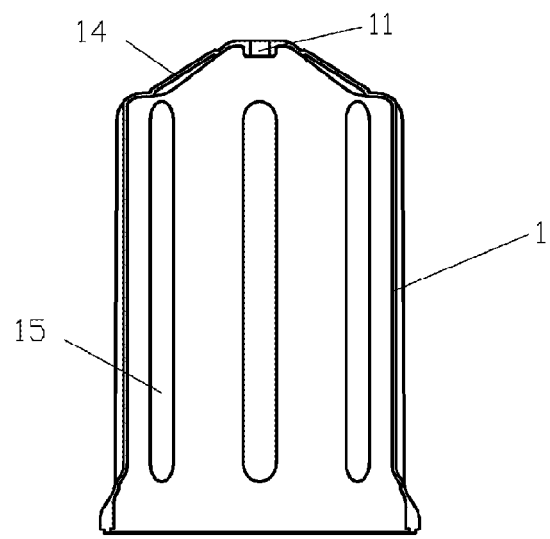

Further details and advantages of the present invention are explained using an embodiment, with reference to the attached drawings. In the drawings:
FIG. 1 is a schematic view of the invention;
FIG. 2 is a sectional view of the invention.

EMBODIMENTS

As show in FIGS. 1 and 2, the measuring cup for waste oil extraction machine disclosed in the present invention comprises a cup body 1 made from organic glass. An explosion-proof valve connecting hole 11, a negative-pressure meter mounting hole 12 and several pull-rod insertion holes 13 are provided on the upper end surface of the cup body 1. The top of the cup body 1 is cone-shaped. Several water-drop-shaped bulges 14 project outwardly and evenly distributed on the outer surface of the cone, in addition, several longitudinal grooves 15 are evenly distributed on the outer surface of the cup body 1.

In the product according to the present invention the upper gland and cup body are formed in one piece, thus ensuring the sealing effect of the product; furthermore the top of the cup body is designed in a cone shape, this configuration is able to effectively sustain the negative pressure produced during the extraction process of the waste oil extraction machine; furthermore again, the product is provided with several bulges 14 and grooves 15 on the outer surface thereof, thereby improving the strength of the measuring cup, enhancing the impact-resistant ability of the product, and creating better appearance.

The invention claimed is:

1. A measuring cup for a waste oil extraction machine, comprising:
   (a) an organic glass made clip body, which is provided with an explosion-proof valve connecting hole;
   (b) a negative-pressure meter mounting hole and a plurality of pall-rod insertion holes formed on an upper end surface of said cup body, a top portion of said cup body being cone-shaped, said cup body being further provided with a plurality of water-drop-shaped bulges projecting outwardly from said cone-shaped top portion of said cup body; and
   (c) a plurality of longitudinal grooves on an outer surface of said cup body;
   wherein, said grooves extend to a transition connecting surface between the cone-shaped top portion and the outer surface said cup body.

2. The measuring cup according to claim 1, wherein said bulges are evenly distributed on said cone-shaped top portion of said cup body.

3. The measuring cup according to claim 1, wherein said grooves are evenly distributed on said outer surface of said cup body.

* * * * *